United States Patent [19]

Martin

[11] 3,742,142

[45] June 26, 1973

[54] REMOTE METER READER SYSTEM

[75] Inventor: Stephen J. Martin, Miami, Fla.

[73] Assignee: Hunter Electronics, Inc., Hialeah, Fla.

[22] Filed: Dec. 28, 1970

[21] Appl. No.: 101,997

[52] U.S. Cl. .................................................. 179/2 A

[51] Int. Cl. .......................................... H04m 11/00

[58] Field of Search ................. 179/2 A; 340/171 R, 340/151, 408

[56] References Cited

UNITED STATES PATENTS

| | | | |
|---|---|---|---|
| 3,553,376 | 1/1971 | Bogaart | 179/2 A |
| 3,551,597 | 12/1970 | Russell | 179/2 A |
| 3,414,676 | 12/1968 | Long | 179/2 A |
| 3,274,584 | 9/1966 | Morgan | 179/2 A |
| 3,266,018 | 8/1966 | Higgins | 179/2 A |
| 2,908,894 | 10/1959 | Kienast | 179/2 A |
| 1,897,657 | 2/1933 | Yates | 179/2 A |
| 1,889,597 | 11/1932 | Fitzgerald | 179/2 A |

*Primary Examiner*—Kathleen H. Claffy
*Assistant Examiner*—David L. Stewart
*Attorney*—John Cyril Malloy

[57] ABSTRACT

A method and apparatus by which a repeating event type meter, such as kilowatt hour meters as used by power companies, traffic counters as used by cities and counties, fuel meters showing number of gallons used, and other similar devices can be interconnected to a telemetering unit, and by remote control from a distant end, either through telephone lines, AC carrier lines or radio, the accumulated count can be displayed at the remote end.

8 Claims, 8 Drawing Figures

FUNCTIONAL BLOCK DIAGRAM
REMOTE METER READER SYSTEM

FUNCTIONAL BLOCK DIAGRAM
REMOTE METER READER SYSTEM

INVENTOR
S. J. MARTIN

BY John Cyril Malloy
ATTORNEY

PATENTED JUN 26 1973

3,742,142

SHEET 2 OF 8

INVENTOR.

S.J. MARTIN

BY

ATTORNEY

SCHEMATIC DIAGRAM, PROGRAMABLE SHIFT REGISTER "ADD" ONE SHOT & RESET PULSER

INVENTOR.
S. J. MARTIN
BY John Cyril Malloy
ATTORNEY.

INVENTOR
S.J. MARTIN

BY John Cyril Malloy
ATTORNEY.

TONE GENERATOR SCHEMATIC DIAGRAM
REMOTE METER READER

INVENTOR.
S. J. MARTIN
BY
John Cyril Malloy
ATTORNEY

INVENTOR.

S.J. MARTIN

BY John Cyril Malloy

ATTORNEY

SCHEMATIC DIAGRAM
TONE SECTION-CENTRAL OFFICE READ-OUT
REMOTE METER READER SYSTEM

INVENTOR.
S. J. MARTIN
BY
John Cyril Malloy
ATTORNEY.

INVENTOR.

S. J. MARTIN

BY John Cyril Malloy
ATTORNEY

REMOTE METER READER SYSTEM

The present invention relates generally to a method by which a repeating event type meter, such as kilowatt hour meters as used by power companies, traffic counters as used by cities and counties, fuel meters showing number of gallons used, and other similar devices can be interconnected to a telemetering unit, and by remote control from a distant end, either through telephone lines, AC carrier lines or radio, the accumulated count can be displayed at the remote end. This is in essence a method of remote meter reading, through telemetry. What is sought, is a patent on the general method of operation, the exact logic by which the system operates, and the circuitry shown in the accompanying drawings whereby the logic described in the text is used in meter reading. Several techniques have been used in the past for remote meter reading. In most cases, prior art techniques depended on a separate device, placed in parallel to an existing meter, developing a voltage, accumulating a charge or generating a time period that was equal to the parameter being displayed by the meter, ie.—current, voltage, temperature, liquid levels in fuel tanks. In most cases, this technique results in an inaccurate reading, or at least in a reading that does not exactly track with the meter being remotely displayed.

Because in some instances, such as reading a kilowatt hour meter in a home, the remote reading must exactly agree with the home meter, the customer is either overcharged or undercharged, the accuracy needed in such a device is very high, ideally, the device should have the exact same accuracy as the device being read. The method described in this application has an accuracy limited only by the number of digits that can be accumulated in an accumulating counter. In a 1,000 digit reader the accuracy is one part in 1,000. In a 10,000 digit reader the accuracy is one part in 10,000. In a 100,000 digit reader the accuracy is one part in 100,000.

The proposed method of operation, uses a mechanical, optical or magnetic interconnection to a standard kilowatt hour meter, gas meter, water meter, or any similar metering device, in such a manner that whenever the zero kilowatt position of the kilowatt hour meter, or the one gallon position of the water meter or the one pound position of the gas meter, goes through zero, one count is accumulated in a separate decimal accumulating counter. The interconnection can be by means of a low torque micro-switch actuated by the zero kilowatt hour needle itself as it goes by zero, in an electric kilowatt hour meter. It can also be by means of a gallium arsenide or other type of light emitting diode being obscured by the needle, or the path between the diode an a photocell being obscured by the needle when in the zero position. A pulse is generated then that can be accumulated in the separate decimal accumulating counter. Conversely, the zero position of permeable needles can be picked up by magnetic heads and a pulse generated. The decimal accumulating counter therefore continuous accumulating zero events all the time while the reader is "on." If by remote tone control, the decimal accumulating counter can be commanded to reset to zero, one decade at a time, and in the process of resetting to zero the counter will generate one tone burst for each step taken in reaching zero, a means is available by which another subtracting counter at a distant point can step one step at a time in synchronism with the counter being reset, and display the actual number the decimal accumulating counter had at the end of the operation. At the end of the operation, the decimal accumulating counter is again at zero, and ready to start accumulating a new count corresponding to a new time period, this time period being any time desired that can be handled by the total capacity of the counter, ie.—a few minutes, hours, days, weeks, or months.

A limitation on the system is that the total time taken by the system in reading an accumulated count must be short enough, in comparison to the rate at which counts are being accumulated, that no counts will be lost. As an example, if a count is accumulated every 20 seconds, and the reader reads in 10 seconds, no count is lost if the reader actuates in the intervening period between counts. The system described in this patent application may be made to operate at any desired speed in the read out mode, with the speed controlled only by the bandwidth of the communications media, about 3,000 hertz per second in a telephone line communications system, about 5,000 hertz per second in a radio system and about 2,000 hertz per second in an AC power line carrier system.

Thirty digits are required to express a 1,000 digit decimal number and 40 digits are required to express a 10,000 digit decimal number. This is accomplished by generating trains of digits, ten for units, ten for tens, ten for the hundreds and ten for the thousands in a decimal code. With a digit corresponding to a tone burst, the meter reading system of this invention can be slowed down or speeded up by the speeding or slowing down the read out logic and changing the band width of the tone receivers. An optimum point for the system for read out appears to be the 5 to 15 second range, within this range enough protection against noise and transients can be obtained, while preserving sufficient speed for high accuracy in most events, such as home power or gas readers.

A preferred method of operation for this system is a two tone method, by which one tone is used to interrogate the remote counter, and the other tone is used to receive tone bursts from the remote counter at the end where the counter is being read. While the interrogation tone is "on," the counter being read stops accumulating counts, and resets to zero while sending tone bursts at a different frequency from that of the interrogation tone, the separation between tones being controlled only by the selectivity of the filters in the tone receivers. The system described in this application must therefore be considered a duplex system, where two way tone transmission is required, with a tone being sent continuously in one direction for control, and tone bursts being sent in the other direction for read out. After the remote counter has finished resetting to zero under remote control, and all decades are at zero, no more tone bursts are sent back regardless of how long the interrogation tone stays "on." This allows removing the interrogation tone at will, without the counters resetting again if the interrogation tone is not removed within a critical period of time.

The system described in this patent application uses solid state accumulating counters, but is not necessarily limited to those counters shown in the schematic diagrams. Decimal counters from other manufactures may be used, and electromechanical stepping counters may also be used of the relay type.

It is, therefore, an object of this invention to provide a method and apparatus by which a repeating event type meter can be interconnected to a telemetering unit and by remote control from a distant point, either through telephone lines, carrier lines or radio, the accumulated count can be displayed at the remote point.

Other objects will become apparent from the following description.

In the drawings, FIGS. 1 through 8 are functional block diagrams of the meter reading system and apparatus, now to be described separately. More specifically:

METHOD OF OPERATION

Figure 1:
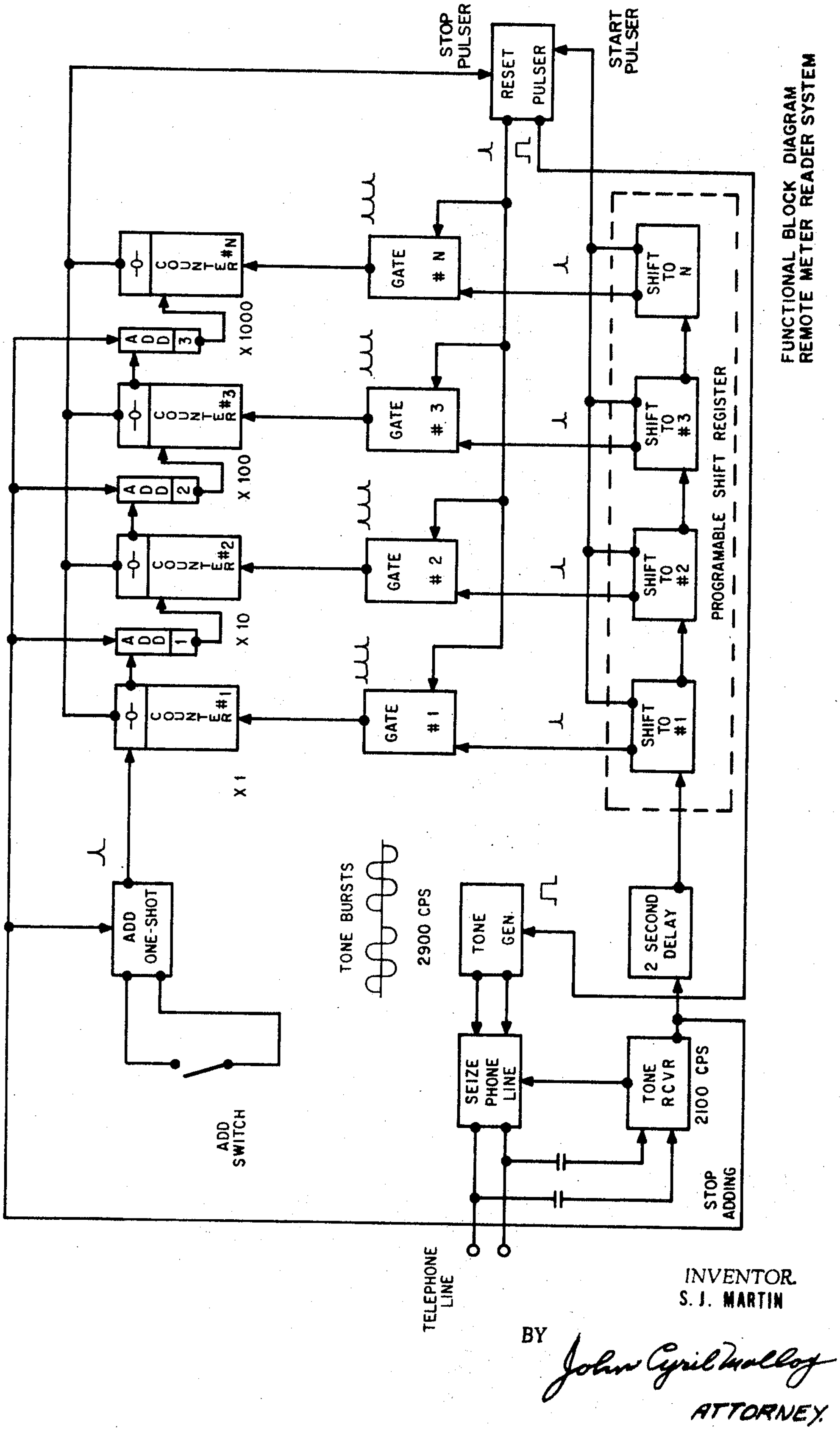
FIG. 1 is a block diagram of the process used in the accumulator counting means.

Reference is made to FIG. 1, Functional Block Diagram, Meter Reader System.

A series of decimal accumulating counters, titled counters 1, 2, 3, and N, are used normally in an accumulating mode, where the counters add one count, every time the add switch closes. The add switch is a micro-switch mounted in the 0 kilowatt position in a standard kilowatt hour meter, in such a manner that every time the needle goes by zero position, the counter accumulates one digit. Conversely, the add switch could be any other type of switch, connected to a fuel meter showing gallons, a pneumatic hose counting traffic, or any other repetitive and accumulating event.

The counters are in an "add" position, when the "add" one shot pulser and the "add" gates are energized. The "add" gates are normally energized, they are in a de-ener gized position only when under remote tone control, the system is in a read out mode of operation.

To operate as a read out device, the system operates in the following manner; a tone receiver looks continuously into a telephone line, decoupled by two capacitors, in such a manner that it does not normally seize the line. The tone receiver bridges the line at high impedance, 20,000 ohms, and therefore does not change normal transmission or reception levels when the line is used with a standard telephone. When a tone of the appropriate frequency to which the highly selective tone receiver is tuned appears on the line, the tone receiver switches a repeat coil to the telephone line, thereby seizing the telephone line. The tone receiver also initiates a two second timer. At the end of two seconds, the timer fires one pulse and starts a sequential shift register. The tone receiver also inhibits the "add" gates and the "add" one shot from counting in an adding mode, when there is a tone on the line. After the two second delay has started the shift register, the register will shift automatically to positions one, two, three, and/or as many as desired, shown as N shifts in the block diagram. The register will stay a programable amount of time, optimally 2 to 4 seconds, at each position. After reaching position "*n*," the register will go "on " at "*n*" position for 2 seconds or whatever time each position is programmed to stay on, and then will go "off". When the register starts, a pulse is generated at its output. This pulse is used to start a reset pulser, shown in the block diagram as "RESET PULSER. " At the same time that the register goes high, an enable voltage is applied to the "read gate No. 1." Read gate No. 1 then feeds reset pulses to counter No. 1. If counter No. 1 is at zero, it will advance ten steps. When it reaches zero again, a stop pulse is generated that stops the reset pulser. If the counter is at any other position, let us say two, it will then advance eight or the required number of steps to reach zero, and upon reaching zero will stop the reset pulser. Therefore, the number of steps that each counter advances in order to reset to zero is the exact inverse reda ing of the number accumulated in each counter. The reset pulser also feeds square waves to the tone generator at the same time that it feeds advance pulses to the counters. One square wave is fed to the tone generator for each "advance one step" pulse that is fed to the counters for reset. Each square wave fed to the tone generator, de-inhibits the tone generator for the duration of the square wave, allowing it to place tone bursts of equal length to the square wave on the telephone line that has been seized by the line seizure circuit.

After counter No. 1 has been reset to zero, by virtue of starting and stopping the reset pulser while feeding it reset pulses through the "read gates", the shift register will stay on position one for a given period of time, and then shift to position No. 2. When the register shifts to position No. 2, the same sequence describde for position No. 1 takes place, with counter No. 2 being reset to zero and "read" gate No. 2 active instead of No. 1. Upon coming "on, " the register fires the reset pulser and feeds reset pulses to counter No. 2 through "read" gate No. 2. Upon counter No. 2 reaching zero, a stop pulse is sent to the reset pulser stopping reset pulses. The same operation repeats itself for counter No. 3 or any number of counters up to "N" counters that may be desired.

After all counters have been reset to zero, and the reciprocal number has been recorded or read out at the distant end from which the meter reader is being interrogated, the distant operator removes the control tone from the telephone line. Upon the control tone being removed from the telephone line, the line seizure circuit ceases to actuate and releases the telephone line. Also, the "add" one shot and the "add" gates are enabled, allowing the counter to accumulate and "add" again. The previous description is equally applicable to other systems not necessarily using telephone lines, such as radio frequency systems, where there is duplex capability for two way tone transmission. In this case, the tone generator would modulate a transmitter and the tone receiver would receive signals from an RF receiver that would be continuously "on." The technique is also applicable to carrier frequency systems where the transmission media takes the form of alternating current power lines, such as are used for electric power distribution, and carrier frequencies in the 40 to 250 kilohertz range are used as carriers. In case of carrier transmission a carrier frequency transmitter and a carrier frequency receiver would feed the meter reader when coupled to an AC power line.

Figure 2:
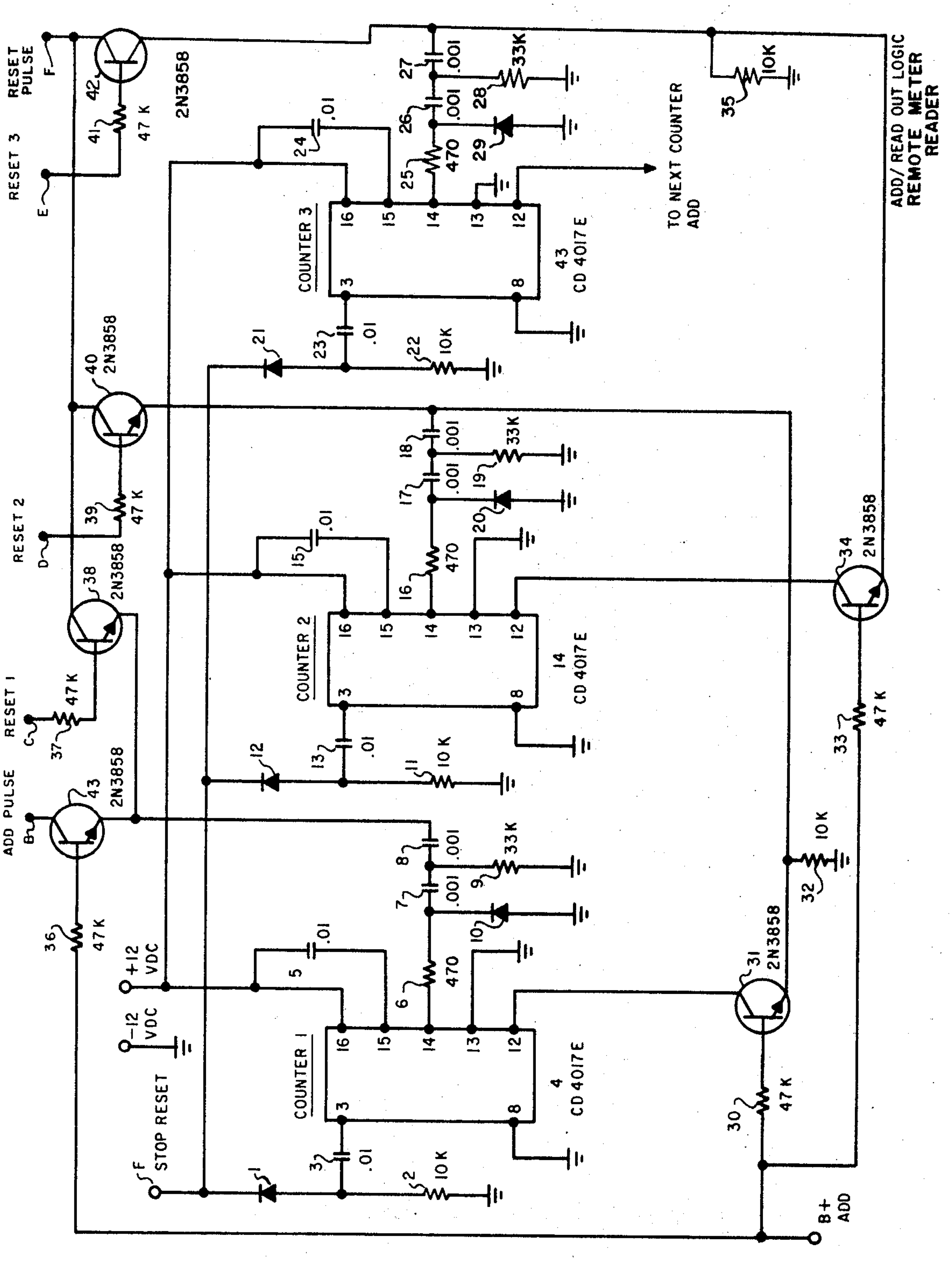
FIG. 2 is a detailed schematic of the accumulating counter proper.

Add/Read out logic, description.FIG. 2., Remote Meter Reader.

The add/read out logic is the section of the remote meter reader that either accumulates events, such as kilowatt hours or gallons, or under tone control from the remote end, resets itself to zero generating a series of tone bursts for remote read out. The add/accumulate logic consists of a series of decimal accumulating counters using integrated circuits, and add or read out gates. When the add gates receive B+ from the tone receiver at the B+ add point, the unit is in an add mode. When B+ "add" is removed from the circuit and either reset gates B, C, or D are activated by the shift register, each counter receives reset pulses from the reset pulser. On receiving reset pulses, each counter individually and sequentially advances from whatever reading it had accumulated to "0."Upon reaching "0" the counter then generates a stop reset pulse that is applied as an inhibiting voltage to the reset pulser, thereby extinguishing the same.

Figure 3:
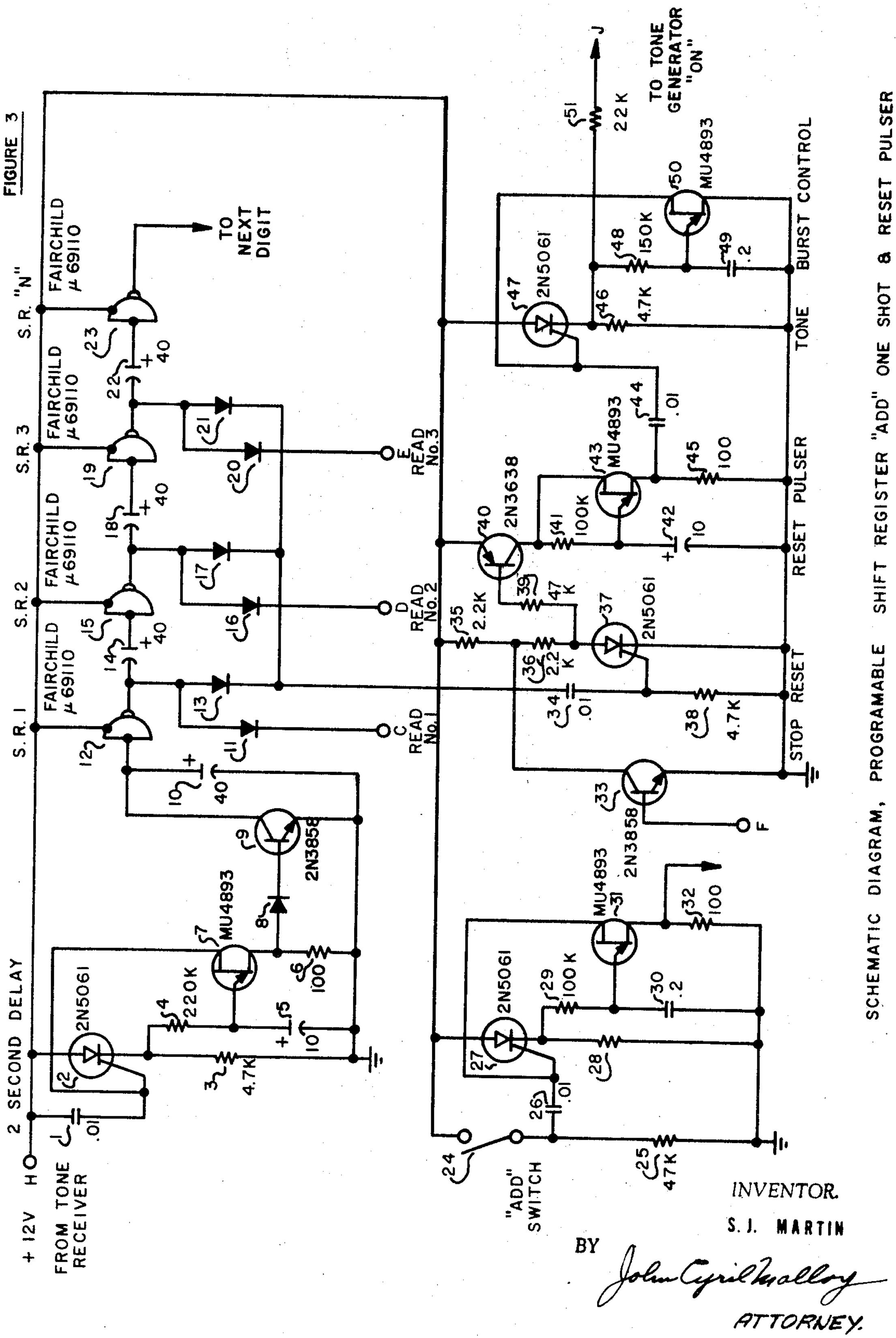
FIG. 3 is a detailed schematic of the method and circuitry employed to reset the counter.

Examining the operation of counter NO.1 in an add mode;counter No. 1 is connected to B+ through pin No. 16 of the integrated circuit and to B− through pin No.8. Item No. 43 a silicon NPN switching transistor, 2N3858,is forward biased by a B+ add voltage applied to the base through item No.36, a 47 K resistor. The add gate receives an "add" pulse from the one shot pulse generator of FIG. 3 every time the switch contacts of switch item 24 of FIG. 3 are closed.The add pulse is fed to pin No. 14 of counter No. 1 through a capacitor resistor shaping network formed by items 7, 8, and 9. Item 10, a silicon diode, is there to protect the integrated circuit from reverse voltage transients. Item 6, a 470 ohm resistor is there to protect the integrated circuit from an accidental input short circuit.

For every add pulse fed to it, the counter will advance one position in a decimal fashion.The counter is at "0" position when B+ is first applied to the circuit, due to the action of item 5, a 0.01 capacitor that gives a "0" set pulse to pin 15 when power comes"on."

When the counter has been fed ten pulses, a "carry count" pulse is generated at pin 12. This carry ten count pulse is then fed to the following counter, counter number 2, by the add gate item 31, also a 2N3858 transistor. The add gate for the next counter, and all add gates, are in a forward biased condition receiving B+ add voltage through items 30, and 33, 47 K resistors when B+ add is"on."

In this manner for every ten counts in counter No. 1, the units counter, one pulse is generated and accumulated in counter No. 2, the tens counter. The carry on pulse from counter No. 1 is fed to the input of counter No. 2 through a capacitor resistor pulse shaping network formed by items 17, 18 and 19.

In the same manner described above, counter No. 2 will count ten pulses and then generate a carry over pulse at pin 12, to signify one unit of tens.Ten units of ten being 100, counter No. 3 will then accumulate units of one hundred.The operation is the same as the previous description, all logical adding sections being the same in design.With three counters a decimal number from "0" to "999" can be counted, with four counters a number to "9999" can be counted, with five counters a number to "99999" can be counted, and the resolution of the counting system can be extended to any desired number by increasing the number of counters and associated gating and shaping circuitry.The system shown in FIG. 2 is drawn to three counters, additional counters are labelled "N" counter in the block diagrams.

The counters used in the design are RCA CD4017 E/D integrated circuits.Any counters from other manufacturers with similar characteristics may be used. In a "read-out" mode of operation, the system operates in the following manner. Upon seeing a control tone from the distant end on a telephone line, the tone receiver of FIG. 4 will switch transistor item 21 to a saturated "on" condition. This will cause the voltage on the collector, at the junction point with item 22 a 10 K resistor, to go down from +12 Volts to 0.5 or 0.7 volts.

Because this point connects to the B+ add "on" for the add gates, the add gates are cut off and the counters can not count as accumulating counters any more. When the tone receiver actuates, it also actuates relay K1. Relay K1 seizes the telephone line and also applies B+ to the programable shift registers of FIG. 3. Upon seeing B+, a one shot 2 second time delay circuit waits 2 seconds, and then applies a start pulse to the programable shift register. The register will then shift sequentially from position one to position two to position three, at a controlled rate, optimally two to three seconds in each position. The shift register then generates control voltages to each of the read-out gates. Upon each shift register position coming "on," a pulse is also generated that starts a reset pulser.

Getting back to FIG. No. 3, assume that shift register position No. 1 is "on." The reset pulser is "on" and pulsing at a given rate, and these pulses are being applied in parallel to the collectors of Items 38, 40, 42, 2N3858 transistors. Because only Item No. 38 is receiving a forward biasing voltage through Item 37, a 47 K resistor, from shift register position No. 1, only this gate is conducting and reset pulses are fed to Counter No. 1 only. Counter No. 1 will then advance to "0" position from whatever count position it may be in, or if it is at "0," it will then count ten and go to "0 again. If Counter No. 1 is at any other position than "0," Capacitor Item No. 3 will be discharged until the Counter reaches "0" position. Upon reaching "0," the Counter will abruptly charge Capacitor Item No. 3 and generate a pulse at the other end of Item No. 3, across a 10K load resistor, Item No. 2. This pulse is fed by a diode, Item No, 1, to a common stop reset line for all counters. The stop reset line connects to an inhibiting transistor, Item No. 33 in FIG. No. 3, and causes Item 33 in FIG. 3 to stop the reset pulser by extinguishing the reset control SCR Item 37 in FIG. 3.

As soon as the "stop reset pulse" is fed to the reset pulser, and the reset pulser stops pulsing, the Counter sees no more reset pulses and stops at "0" position. When Counter No. 1 has been reset to "0," it stops and nothing happens until the programable shift register of FIG. 3 has shifted to position No. 2. Upon the shift register reaching position No. 2, the same procedure is repeated. Reset gate No. 2 is activated, the reset pulser is fired and starts pulsing, and reset counter pulses are fed to Counter No. 2. Counter No. 2 then advances to "0," and upon reaching "0" generates a stop reset pulse, inhibiting the reset pulser and causing it to go "off," until turned "on" again by the next shift register position. This process can be added to as desired to cover any desired number of counters, using the same logic.

If upon activation of read out a counter is on position "0," Capacitors Item 3, 13, or 23 are already fully charged and no pulse is generated to the stop pulser line. For a pulse to be generated the Capacitor must be discharged by the Counter advancing to some other number from "0," one step will do, and then coming back to "0" abruptly charging the Capacitor. In this manner if the Counter is at "0" and commanded to reset, it will count 10 pulses and stop at "0" again, indicating to the distant end a "0" position count.

The above described schematic diagram can be implemented with other transistors and other integrated circuits than those shown. Values and exact types of semi-conductors are given to illustrate functions and teach the operation of the system. It is the logical sequence of operation and the technique involved to provide meter reading that are claimed in this patent application.

Programable shift register, "add" one shot and reset pulser description FIG. 3. Remote meter reader.

It is this section of the meter reader that contains the logic by which the meter reader is commanded to reset to "0," counter by counter, while generating a complimentary count that can be used at a distant end to determine the number of pulses taken by the acummulating counters in reaching "0," and therefore what the accumulated count was before remote reading. It is also this section that generates pulses a suitable length and time to place tone bursts on a telephone line, indicating to the distant interrogation point a reading.

Figure 4:
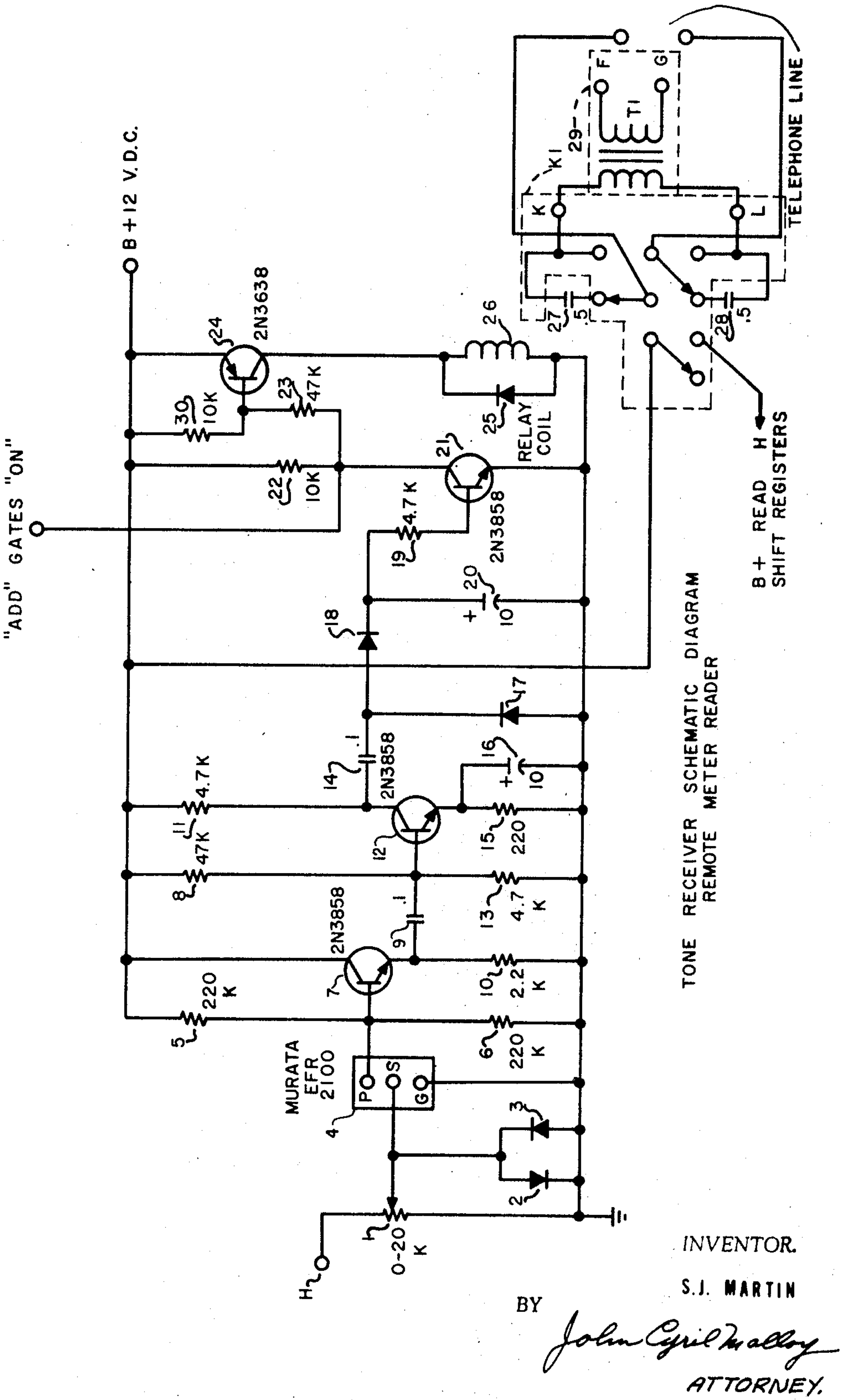
FIG. 4 is a detailed schematic of the circuit used to receive tones and seize the communication channels.

When the tone receiver of FIG. 4 sees a control tone on a telephone line, it closes relay K1. Besides seizing the telephone line, relay K1 also applies B+ to the programable shift register and reset pulser logic. To prevent accidental or short actuation of the tone receiver by voice or other frequencies from activating the meter reader, the programable shift register will not start until two seconds of continuous reception of control tone have gone by.

The 2 second delay one shot consists of an SCR, item 2 in FIG. 3, a unijunction transistor item 7 in FIG. 3 and associated resistors and capacitors, items 1,3,4,5,6. The SCR item 2 is fired "on" by a pulse received through capacitor item 1, when B+ is applied to the circuit. The cathode of the SCR turns positive and 11.2 to 11.5 volts are applied across item 3, a 4.7K SCR load and hold resistor. When the cathode of the SCR goes positive, a 10 microfarad capacitor, item 5 starts charging through a 220 K resistor, item 4. The capacitor takes 2 seconds to charge to the firing point of the unijunction transistor item 7. When item 7 fires at the end of two seconds it does two things. It extinguishes SCR item 2 by robbing power from the gate (gate extinguishing of SCRs) and generates a sharp pulse across the 100 ohm resistor, item 6, in Base 2 position of the UJT. Through a diode item 8, this pulse is applied to to the input gate of a Zener controlled HEX inverter, Fairchild 69110 or similar, causing that gate to deplete by the action of item 9, an NPN 2N3858 transistor, conducting to ground. Item 9 discharges fully capacitor item 10, a 40 microfarad non polarized or polarized capacitor. When capacitor item 10 discharges to zero, the HEX inverter gate turns "off" and its output point goes high. The first gate is shown as item No. 12 in the schematic diagram, in actual practice, six such gates are enclosed in one single integrated circuit in the Fairchild 69110 circuit. Any similar HEX inverter integrated circuit with an abrupt switching point may be used.

Capacitor item 10 will then take a given period of time to charge to the HEX switching voltage of the inverting gate, and the output of the gate will remain high untill the capacitor reaches this voltage, in the Fairchild 69110 this is 6.2 volts. Upon reaching 6.2 volts, the gate will switch "on" or low, and the output will go low. The time when the output of the gate went high may then be used as a variable control time for each of as many register positions as required, the timing being controlled by the input resistance of the gate, and a capacitor to ground or "low." This timing can be any desired period of time by selecting the appropriate capacitor and gate.

When the output of the first gate item 12 goes high first and then low, it discharges capacitor item No. 14 in the input of the nest gate, item No. 14 in the diagram. The same procedure then occurs. The output of the second gate item 15 will go high while the capacitor is charging again to 6.2 volts, and will remain in a high state until the capacitor reaches this charge. It will then switch to low and remain there. A second time period is generated in the present system equal to the first, but if needed it can be a different value for each position of the register.

After finishing its time period, gate No. 2 item 15 will discharge capacitor item 18 and shift the register to the next stage where a new time period will be generated. This process can be continued to as many or "N" number of stages as may be required without any practical limitation. This circuit then becomes a variable programable scanner, where the rise of the different gates can be used to initiate functions, scan, or look at different events in a chain of events. The device can also be used as a programable timer with "N" events, the number of time periods being controlled by the number of gates used.

When a gate comes "on," meaning that its output goes "high" the following events occur. Taking gate No.1 the first position of the shift register, a pulse is generated and applied to SCR item 37, through diode item 13 and capacitor item 34. Through diode item 11 a B+ voltage is also applied to read-out gate No.1 in FIG. 2, thereby applying reset pulses to counter No.1, while gate 1 is high.

The reset pulses are generated by a PNP transistor item 40, a 2N3638 or similar, conducting and charging capacitor item No. 42, at a rate controlled by resistor item No. 41, as shown a 100 K resistor. The 100 K and 10 microfarad capacitor of items 41 and 42 are connected to the emitter of a unijunction transistor item 43, and the unijunction pulses, charging and discharging capacitor 42 at a selected rate, optimally 10 times in 1.5 seconds. Item 43 has a sharp pulse appearing across a 100 ohm resistor in base 2, and this pulse is fed through a feed through 0.01 capacitor item 44, to the gate of an SCR item 47. SCR item 47 and unijunction transistor item 50 act as a one shot pulse generator, generating a square pulse of duration controlled by capacitor item 49 and resistor item 48. This square pulse is applied to the tone generator on position of the tone generator of FIG. 5, placing a tone burst on the telephone line. The reset pulser combination of SCR item 37, transistor item 40 and unijunction item 43, will stay on and pulsing, and feeding reset pulses to counter No.1, until counter No. 1 of FIG. 2 reaches "0"position. A stop reset pulse is then generated and applied to point "F" in the schematic, the base of an NPN 2N3858 transistor, or similar, that extinguishes SCR item 37 by robbing holding power from the anode, by grounding the center of a divider network formed by items 35 and 36, two 2.2 K ohms resistors.

The reset pulser after being extinguished, stays "off". The reset pulser comes on again after gate No.2 in the shift register goes high at its output, and remains pulsing and advancing counter No. 2 of FIG. 2 to "0," until stopped by a stop pulse generated by counter No. 2 on reaching "0." This process can be repeated as many times as desired, to reset to "0" Counters No. 3, 4, or 5 or "N" number of counters, depending on the resolution desired for the meter reader.

The one shot add pulse generator consist of Items 27 and 31, and SCR and Unijunction transistor, with the SCR fired by momentary closure of the add switch, Item No. 24. When the switch is closed, a pulse is generated by Item No. 26, a 0.01 capacitor. This pulse is fed to the gate of SCR Item 27 and fires it "on." The cathode of SCR Item 27 goes high, and Capacitor Item 30, a 0.0 microfarad capacitor starts charging through a 100 K resistor, Item 29. When Capacitor Item 30 reaches the firing point of unijunction Item 31, UJT Item 31 conducts and through its base 1 connection extinguishes SCR 27, by robbing power from the gate. In the manner the circuit acts as a fixed one shot pulse generator, with its output independent of the time period that the switch is closed, this time being variable in the circuit shown from 50 milliseconds to infinity, with the one shot generating only one fixed pulse of duration controlled by Items 29 and 30. The circuit can also be used to eliminate bounce in mechanical switches, or any similar application where a sharp pulse from a bouncing intermittent closing switch is desired.

In the circuit, the sharp pulses are applied to the counters on an add accumulate mode by connecting base 2 of unijunction Item 31 to the input of the add gate Item 43 in FIG. 2.

Tone Receiver schematic diagram, description, FIG. 4. Remote Meter Reader.

The tone receiver of the remote meter reader is used as a means of commanding the reader, from a distant end and through tones appearing on a telephone line, to change modes from an add-accumulate mode of operation to a read-out mode of operation, resetting itself to "0."

The tone receiver uses a tuning fork filter, and suitable time integration, to protect the meter reader from voice or other frequencies appearing in a telephone line, when the reader sits in parallel to a standard telephone line monitoring this line continuously, and the line is in use by a standard telephone, carrying standard telephone conversation. The tone receiver is not responsive to dialing tones, regular audio conversation, high level sounds, or other audio frequencies, except a stable very exact tone of minus or plus 3 hertz per second coming from the interrogation end, of the same frequency as the tuning fork filter in the receiver. This tone must appear continuously for 0.5 seconds in order for the receiver to actuate, and for 2 seconds in order for the meter reader to read-out. Due to the unusual features built into the tone receiver, the meter reader can sit in parallel to a regular telephone in use, and not be actuated, except by a part having the proper tone interrogation equipment.

Figure 5:
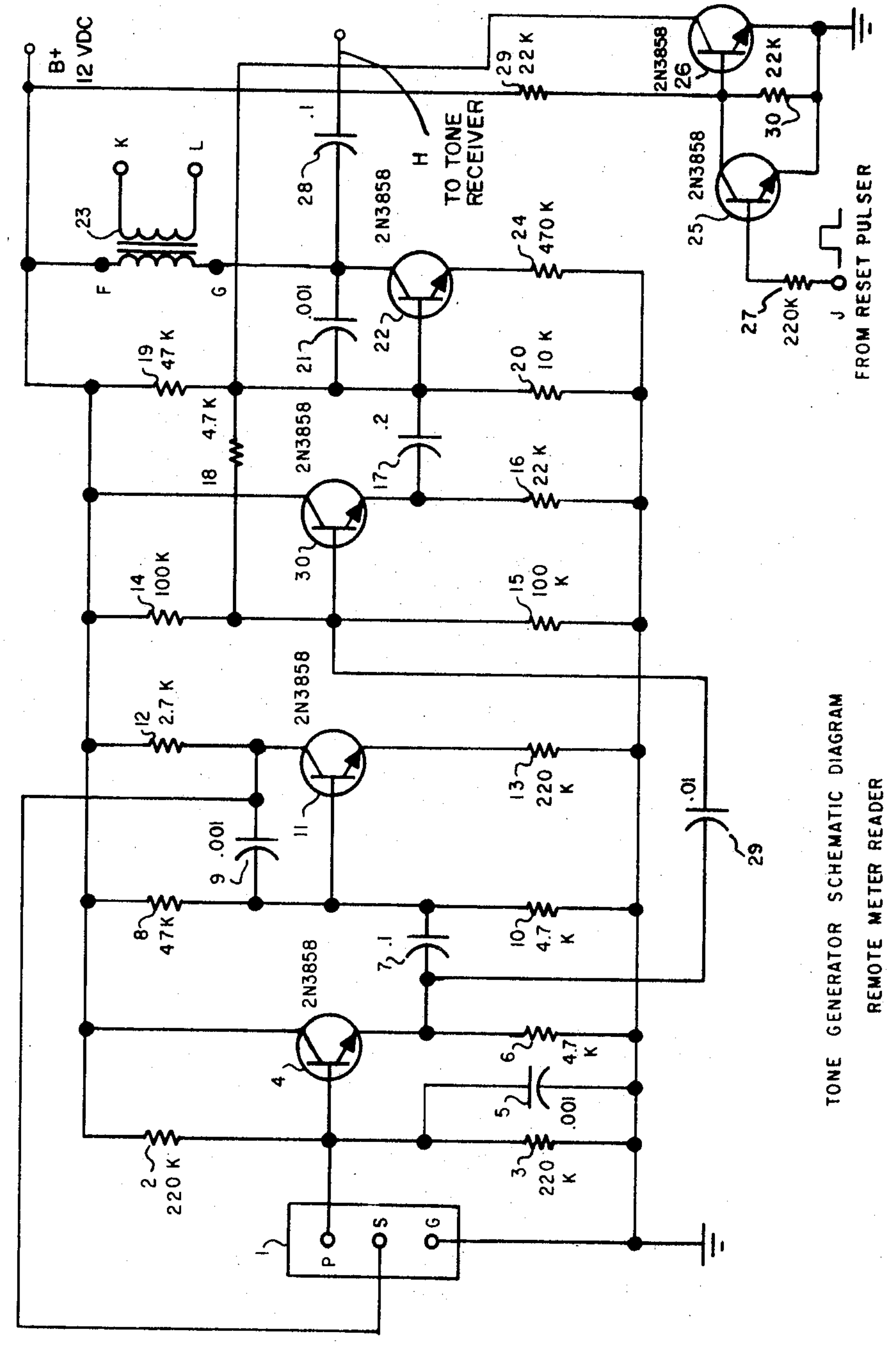
FIG. 5 is a detailed schematic diagram of the method and circuitry employed to transmit tone indicating the accumulated count.

The tone receiver obtains tones from a telephone line, either through capacitors item 27 and 28, connecting to transformer item 29 (transformer T1) points K and L, and through the secondary of this transformer also shown in FIG. 5, Tone Generator, at point G coupling through a capacitor item 28 of FIG. 5 to the input of the tone receiver, point H in FIG. 4, also labelled point H in FIG. 4; or when the tone receiver actuates by bypassing capacitors items 27 and 28 by having relay K1 place the repeat coil, transformer T1 directly across the telephone line thereby seizing the telephone lines and providing a feed through path to the tone receiver.

Transformer T1, item 23 of FIG. 5 thereby forms a duplexing circuit by which tones can either be sent to a telephone line, or received from the same line, at a minimum loss of no more than 3 db.

The gain of the tone receiver can be controlled by adjusting the variable resistor item No.1 in FIG. 4, to any desired gain from zero to maximum. A pair of diodes inverted in polarity at the variable arm of item 1, these diodes shown as items 2 and 3, prevent high level transients on the phone line from entering the tone receiver by clipping all signals in excess of 1 to 1.3 volts at the input of the tone receiver.

The incoming tones on the telephone line are filtered by a tuning fork filter, item 4, and fed to the first stage of the tone receiver. The filter is shown as a Murata EFR 2100 tuning fork, but it can be any high selectivity tuning fork filter. The filter shown in the diagram operates at 2,100 hertz per second, plus or minus 3 hertz. Items 5 and 6 are biasing resistors for an emitter follower stage, using item 7 an NPN 2N3858 or similar, converting a high impedance to a low at item 10, a 2.2K resistor. Item 9 is a 0.1 feed through capacitor, coupling signal to the next stage, transistor item 12. The second stage is biased by items, 8,13,15 and 11,47K,4.7K,220 ohms and 4.7 K biasing resistors. The emitter is bypassed by item 16, a 10 microfarad capacitor.

The second stage couples to a diode rectifier pair, items 18 and 17, through a 0.1 isolation capacitor, item 14. The diode rectifiers produce a DC voltage when a tone appears in the input, the output of which is filtered by capacitor item 20. Through a 4.17 K resistor item 19, a DC voltage is applied to a complimentary pair switch formed by transistors items 21 and 24. Transistor item 24 is a relay driver, used to switch Relay K1. Item 25 is a transistor protection diode that eliminates inductive kick back from K1.

Relay K1 also has a connection point that applies B+ to the shift register stages when the tone receiver actuates.

The collector point of transistor item 21, being high in the absence of a tone, is also applied to the add gates of FIG. 2, to place them in an add mode.

Tone generator schematic diagram, description. FIG. 5. Remote MeterReader. The tone generator is the device that converts the pulses generated by the counters of FIG. 2 on resetting to "0," to tone bursts, suitable for transmission through telephone lines to a distant interrogation point. It is these tones bursts that are detected at the distant point, and displayed as the actual count in the meter reader before this reader is reset to zero.

The tone generator is a two stage oscillator, using the same tuning fork filters described for the receivers, but operating at a different frequency from that of the tone receiver. The two stage oscillator employing feedback from the second to the first stage is followed by an emitter follower and a one stage amplifier. Both the emitter follower and the one stage amplifier are permanently inhibited by a transistor switch, and only amplify when the transistor switch inhibitor is removed. The inhibitor is removed by applung to it pulses from the reset pulser one shot pulse generator.

An amplifier stage formed by item 11, a 2N3858 transistor or equivalent, has its output connected to the input of a tuning fork filter, item No.1. The stage is biased in a class A mode by items 8,10,12 and 13, biasing resistors. Item 9 is a feedback capacitor to stabilize the same stage. Through an emitter follower formed by transistor item 4 and its biasing network, the output of the tuning fork filter is fed back to the stage formed by item 11, thereby creating an oscillatory path and a two stage oscillator.

The output of the oscillator is taken of the emitter follower by capacitor item 29 a 0.01 capacitor, and fed to the base of the emitter follower formed by item 30, and its biasing resistors items 14,15 and 16. The emitter follower feeds a one stage amplifier item 22 is its transistor. The one stage amplifier has T1, the secondary of the telephone seize repeat coil, connected as a collector load, and thereby is capable of generating tones into the phone line. Both the emitter follower and final amplifier have their bases connected to ground through a Darlington pair transistor switch formed by items 25 and 26, a pair of NPN 2N3858 transistors, or equivalents. The first part of the pair, item 26, is permanently forward biased by a 22K and 22K voltage divider. This divider is shunted at its center by a second transistor, item 25. When a base voltage is applied to item 25 by the one shot pulse generator in the reset pulser, item 26 is de-inhibited, its base is grounded, and transistor item 26 goes into cut-off, thereby allowing the bases of items 30 and 22 to reach their gain bias condition, and placing a tone burst on the telephone line.

Because B+ in the device is at AC ground, the B+ end of T1, item 23 or point F in FIG. 5, is at AC ground potential (not DC but AC). The collector of item 22 represents a high impedance to the telephone line, therefore with one end of T1 being AC low and the other end being AC high, the transformer acts as a duplexer permitting tones to be sent out or received in, from the telephone line, at a minimum loss, nominally, 3 decibels.

Point H in the tone generator connects to point H in the tone receiver through a 0.1 microfarad isolating capacitor, item 28 in FIG. 5.

Figure 6:
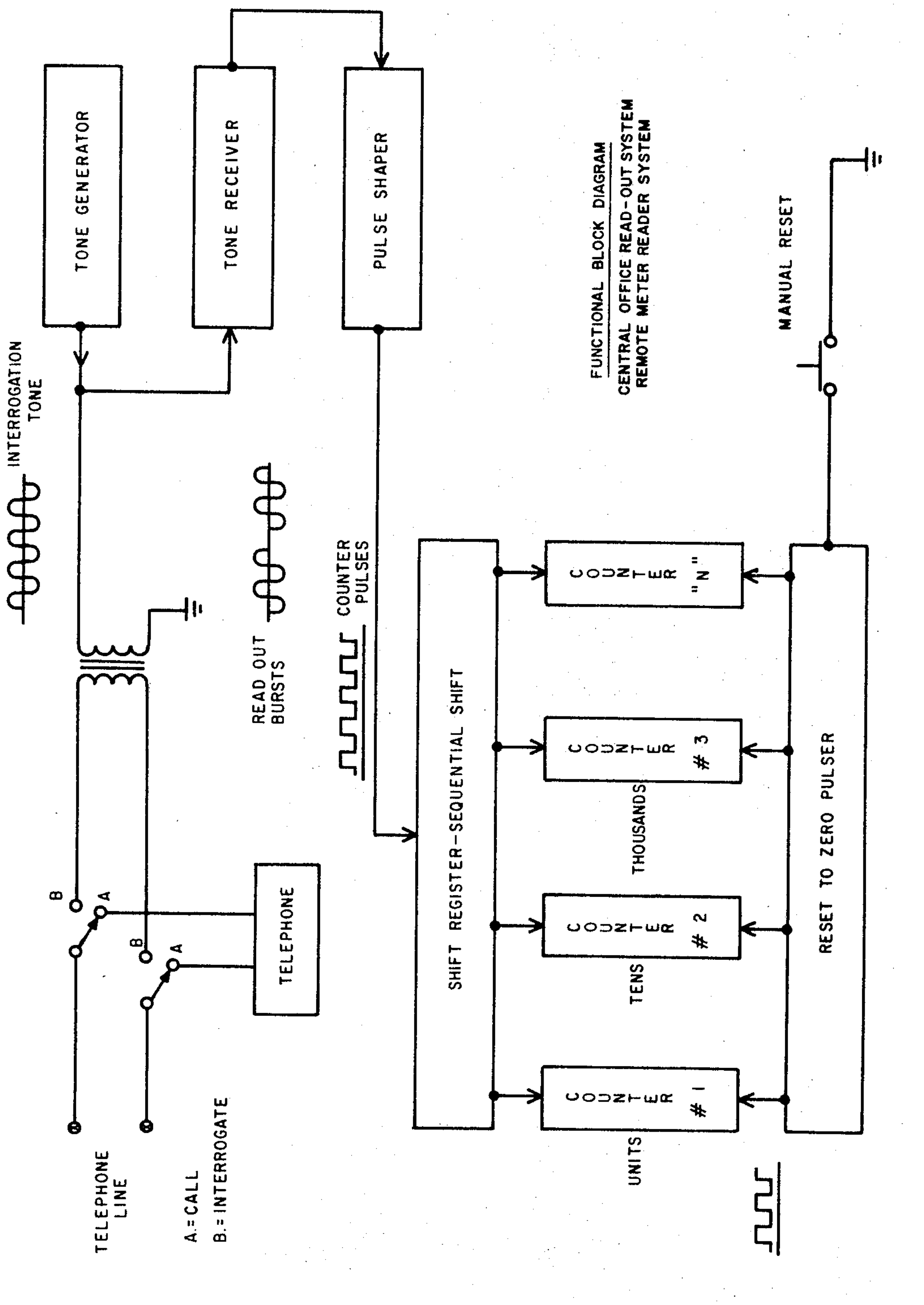
FIG. 6 is a block diagram of the process used at the reading station to read the accumulated data.

Functional Block Diagram, Central Office Read-Out, Remote meter reader system. Description of FIG. 6.

The central office read out unit consists of a tone receiver, a tone generator, a pulse shaper, a shift register counter and individual counters. The counters are Durant 1141 series decimal stepping counters, but any similar stepping decimal counter with a digit display may be used. Counters 1,2,3, and N are subtracting counters, the shift register is a standard adding counter. A reset pulser is used to feed 60 hertz reset pulses to the counters and reset them to "0."

The unit functions in the following manner: a double pole double throw switch connects a telephone line, alternately to a standard telephone set and then to a repeat coil. When the switch is on the telephone set side, the phone may be used to call a given telephone number, corresponding to the telephone to which the remote meter reader is connected, i.e., a subscribers number in the list of customers of a power company.

After the number has been called, and immediately after the last digit is dialed, the switch is thrown over to the repeat coil position, position B in the block diagram. In this position a fixed tone is placed on the telephone line. Also, a tone receiver looks to the telephone line and sees any bursts of tone coming back from the distant meter reader unit. At the distant point, the meter reader sees the control fixed tone, and after two seconds starts resetting itself to "0" digit by digit as previously explained, and sends back tone bursts that are the inverse complement of a number accumulated in an accumulating decimal counter, i.e., if the counter had "7," the unit would send back three bursts, the complement to "0" when resetting to "0." The tone receiver sees the bursts coming back, detects them, converting them to a DC pulse, feeds these DC pulses to a DC pulse shaper network, and sequentially applies them to each of a number of subtracting counters.

The shift register counter will shift at the end of a train of pulses and not in between pulses. On position "0," the register will feed count pulses to the coil of counter No. 1, after shifting to position 1, it will feed count pulses to the count coil of counter No.2, and so forth for any desired number of counters. The counters will reject tone bursts at any but the pre-selected tone burst frequency by means of a very sharp tuning fork filter in the tone receiver. The counters will also reject bursts of unequal length by means of time integration in the tone receivers and pulse shaper. The unit therefore has a very high ratio of noise discrimination and will count accurately and without errors even if there is voice on the line or other tones. It will only see those tone bursts of the right frequency and right time duration that have been designed into the system. The system is insensitive to noise transients on the phone line, dial pulses or dial tones as used in tone dialing.

The counters have a secondary set of switches, rotary switches, that are used to reset to "0." After the desired read-out is displayed, and either a human operator has transferred the reading to a tabulation pad, or the reading has been transferred to a tape or card memory for computer processing automatically, (the computer interface has not been shown because it is not a part of this patent application), the system operator, either a human being or a programed machine, resets to "0" by actuating the "0" reset position and placing the control switch back on A position, the telephone side of the switch. The central office read-out unit is then ready to make another call and interrogate another remote meter reader.

Figure 7:
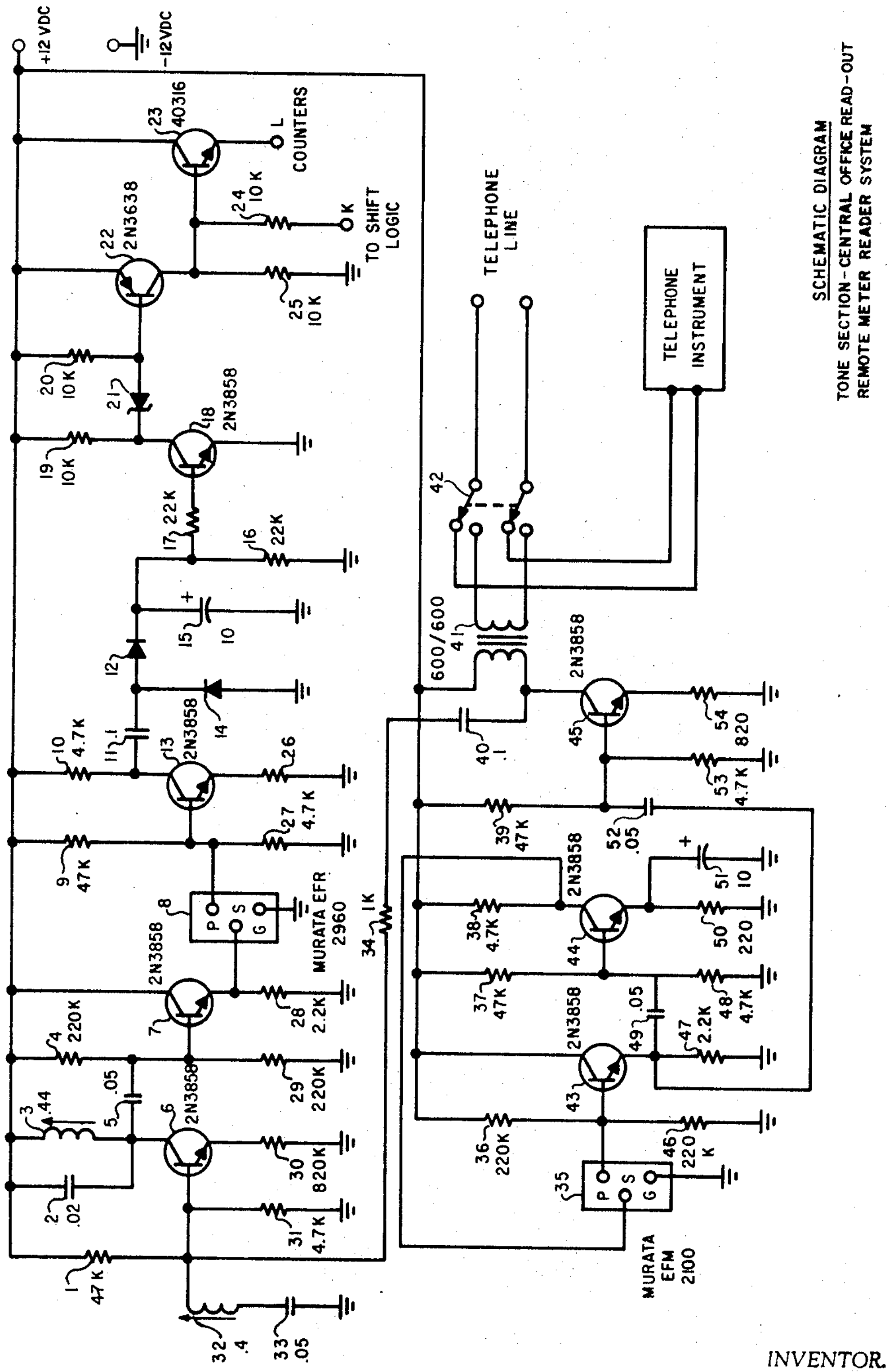
FIG. 7 is a detailed schematic of the tone transmitter and tone receiver and interconnection to the communication channel at the central office interrogation station.

Schematic Diagram, Tone Section, Central Office Read-out unit, Remote Meter Reader System. Description of FIG. 7.

Through a 600/600 ohm standard repeat coil, the tone section is connected to a telephone line. When connected to the telephone line, a continuous fixed frequency tone is applied to the line through item 4, the repeat coil. The tone generator is a two stage feedback oscillator, coupled to an output stage formed by item 45, a 2N3858 transistor or equivalent, and its bias network, items 39,53 and 54. Item 45 is biased class "A," and item 4, the repeat coil, acts both as an output transformer to the phone line and an input transformer for the tone receiver.

The output of item 44, a 2N3858 transistor or equivalent, is fed to the input of an emitter follower, item 43, through a frequency selective tuning fork filter, Murata EFM 2100. The frequency shown in the drawing is 2,100 hertz, but any other suitable frequency may be used. Through the filter, 2,100 hertz energy is fed to the emitter follower, and coupled through a 0.05 microfarad capacitor connected at one end to a 2.2K resistor, item 47 the load resistor of the emitter follower, and at the other end, the 0.05 item 49 capacitor is connected to the base of item 44, thereby completing the feedback path and allowing the oscillator to oscillate. Item 52, a 0.05 capacitor couples the output of the two stage oscillator to the output amplifier, and through item 4 the 600/600 ohm tank coil of this amplifier feeds the control tone to the phone line at the right frequency and right level. The unit meets telephone standards and places 0 dbm on a telephone line. The oscillator has a linearity of 0.1 percent and harmonics are down 40 db from output reference level.

Item 40, a 0.1 microfarad capacitor, is decoupled by item 34 a 1 K resistor, and fed to a tuned amplifier stage, formed by item 6, a 2N3858 transistor or equivalent. Items 1,31 and 30 are the biasing resistors for this stage. Items 32 and 33 a 0.4 Henry coil (tunable) and a 0.05 capacitor form a tunable filter of the trap type, and serve as a trap to keep the high level 2.100 hertz control tone out of the tone receiver input, and prevent saturation of this stage.

The first stage of the tone receiver is broadly tuned to 2,900 hertz, the incoming tone burst frequency, by a 0.44 tunable coil item 3 and a 0.02 capacitor item 2. The output of the first stage is coupled to an emitter follower formed by item 7, a 2N3858 transistor, with items 4,29 and 28 forming the biasing network of the emitter follower. A frequency selective tuning fork filter, item 8 Murata EFR 2900, is used to couple between item 28, the emitter follower load resistor and the base of amplifier item 13, a 2N3858 transistor. Items 9,10,27 and 26 are the biasing resistors for the amplifier of item 13, with the amplifier biased class "A."

The output of the third stage, item 13, is fed through an isolation capacitor item 11 a 0.1 microfarad capacitor, to a diode rectifier formed by items 12 and 14, a pair of silicon signal diodes. Items 15 and 16 are a filtering and time discrimination network used to filter and match the output of the tone receiver converting the AC tones into a DC pulse of the required amplitude and duration. Through item 17, a 22K resistor, the DC pulses are directly fed to the base of item 18, a 2N3858 transistor. Items 18 and 22, a 2N3858 and 2N3638 transistors, form a non inverting complimentary pair switch. Item 21 is a 3 to 8 volt zener diode (value not critical) and is used to sharpen the time response of the switch. Items 19,20 and 25 are the biasing resistors for the complimentary pair switch. The output of the switch is direct coupled to the base of item 23 an NPN power transistor, a 40316 (RCA) is shown but any similar type may be used. Item 23, the 40316 transistor is used as a power switch to switch each one of the subtracting counters, through the shift register. Position L connects alternately to the coils of counters 1,2, 3 or N through the shift register. Item 24, a 10K resistor, is used to feed the output of the complimentary pair switch to the shift register shift and pulse shape network of FIG. 8. The unit operates at 10 to 15 VDC, voltage is not critical. 12 VDC is shown as optimum.

Schematic Diagram, Shift Logic, Pulse Shaper and Reset to "0." Central Office Read-out Unit, Remote Meter Reader System. Description of FIG. 8.

Figure 8:
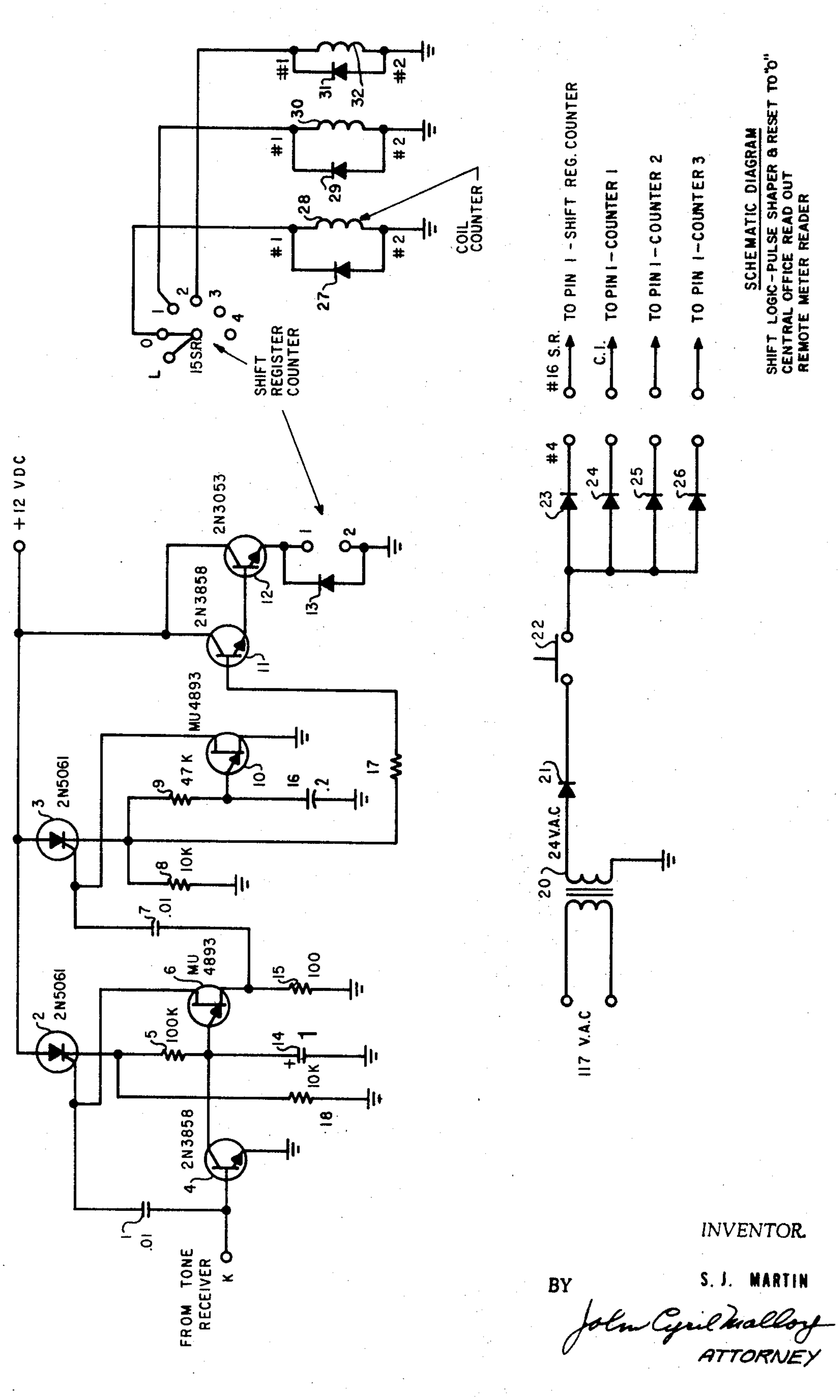
FIG. 8 is a detailed schematic drawing of the control circuit for the central office subtracting and display counters.

Item 2 of FIG. 8, a silicon controlled rectifier, SCR, is fired through item 1 a 0.01 microfarad capacitor, by a positive going pulse at point K. This pulse comes from the complimentary pair switch in the tone receiver. At the same time that it fires item 2, the pulse is applied to item 4, a 2N3858 transistor, or equivalent, and keeps item 14, a 1 microfarad capacitor discharged. Successive pulses or square waves keep item 14 from charging. When a train of pulses stops, transistor item 4 cuts off, and allows capacitor item 14 to charge through resistor item 5, a 100 K resistor. When the 1 microfarad capacitor in the emitter junction of item 6, a unijunction transistor, has charged to the firing point of the unijunction, the unijunction fires. When the unijunction fires, it extinguishes SCR item 2, and applies a sharp pulse to the gate of SCR item 3 through a coupling capacitor item 7, a 0.01 microfarad capacitor. Items 3 and 10, an SCR and unijunction transistor, form a one shot square pulse generator used to convert a sharp pulse to a suitable shift pulse for the shift register counter in the display system of the unit. The 47 K resistor item 9 and the 0.2 microfarad capacitor item 16, control the square wave width and form; an approximately 50 milliseconds long pulse.

Items 11 and 12 are a darlington pair formed by transistors item 11 a 2N3858 or equivalent and transistor item 12 a 2N3053 or equivalent. The darlington switches the coil of the shift register counter and causes it to advance one position. The shift register counter then connects the count pulses from the tone receiver position L sequentially to the different counters for a decimal numerical display and count.

Diode item 13 is a silicon diode used to elliminate inductive kick back from the shift register coil. Items 27, 29 and 31 serve the same purpose.

Item 20 is a 117 Volts AC to 24 volts AC transformer. Item 21 is a power diode that rectifies this voltage and provides positive half cycle pulses, suitable for resetting all counters in the central office read-out unit. The positive reset pulses are applied to all counters in parallel through item 22, a momentary action through switch. Items 23,24, 25 and 26 are isolation diodes used to feed the reset pulses to all counters while isolating them when they are in a counting mode.

What is claimed is:

1. A process for remote reading of meters, such as kilowatt hour meters, gas meters and fuel meters, which includes the steps of:

electrically interconnecting the meter to be read to a decimal accumulating counter means;

electrically connecting the counter means to a communication channel with interrogating and readback circuitry, accumulating and storing unit counts from the meter to be read in the accumulating counter means;

interrogating the counter means through the communications channel;

resetting the counter means to zero, and simultaneously generating a plurality of series of tone bursts, each series of bursts containing bursts equal in number to the difference between the number in one stage of the counter and a predetermined number.

2. The process as set forth in claim 1 including the step of sensing remotely the communications channel to determine if the channel is in use; and if not in use, seizing the communication channel by sending a tone; and interrogating the counter means by a programming device and recording the data accumulated in the counter means.

3. The process as set forth in claim 2 wherein the step of interrogating includes the steps of transferring and displaying as many numbers as required to repeat the count on the meter being read at a reading station.

4. The process as set forth in claim 3 wherein a plurality of separate counters are included in the counter means, and a plurality of separate counters are provided at a reading station, the counters at the reading station being subtracting counters, and the process of interrogating includes the step of shifting from one subtracting counter to another at the reading station under control of a time period between tone bursts of the counter means, said time period being no less than 50% of the duty cycle of the tone bursts.

5. The process as set forth in claim 1 wherein the communication channel is a telephone line.

6. The process as set forth in claim 1 wherein the communication channel is a radio frequency carrier system.

7. The process as set forth in claim 1 wherein the communication channel is a power line carrier system.

8. The process as set forth in claim 1 including the step of feeding the information received at the reading station to a computer for processing of the data.

* * * * *